(12) United States Patent
Sinnett et al.

(10) Patent No.: US 7,005,987 B2
(45) Date of Patent: Feb. 28, 2006

(54) ACOUSTIC WAVE DEVICE WITH DIGITAL DATA TRANSMISSION FUNCTIONALITY

(75) Inventors: Jay Clifford Sinnett, Greenville, SC (US); Jack Thiesen, Easley, SC (US)

(73) Assignee: Michelin Recherche et Technique S.A., (CH)

(*) Notice: Subject to any disclaimer, the term of this patent is extended or adjusted under 35 U.S.C. 154(b) by 300 days.

(21) Appl. No.: 10/697,576

(22) Filed: Oct. 30, 2003

(65) Prior Publication Data

US 2005/0093688 A1  May 5, 2005

(51) Int. Cl.
*G08B 13/14* (2006.01)
(52) U.S. Cl. ............... 340/572.1; 340/572.4; 340/442; 340/447; 340/73; 340/146
(58) Field of Classification Search ............ 340/572.1, 340/572.4, 442, 447; 73/146
See application file for complete search history.

(56) References Cited

U.S. PATENT DOCUMENTS 6,476,712 B1 * 11/2002 Achterholt .............. 340/447
6,507,276 B1 * 1/2003 Young et al. ............ 340/447
2002/0014115 A1 * 2/2002 Young et al. ............ 73/146
2002/0117005 A1   8/2002 Vile et al.
2003/0234722 A1  12/2003 Lonsdale et al.

FOREIGN PATENT DOCUMENTS

WO    WO 0247924 A1    6/2002

* cited by examiner

*Primary Examiner*—Julie Bichngoc Lieu
(74) *Attorney, Agent, or Firm*—Dority & Manning, P.A.

(57) ABSTRACT

An improved electronics assembly for integration with a tire structure includes an acoustic wave device such as a SAW sensor connected as a feedback element in an active amplifier and further coupled to an antenna element, thus forming an active transmitter configuration. Such a circuit configuration provides for the ability to actively transmit a combination of information from integrated tire electronics to a remote receiver location. The combination of information corresponds to the physical parameters sensed by the acoustic wave device as well as digital data superimposed on the RF signal emitted by the acoustic wave device by selectively switching the amplifier on and off. Optional integrated power sources configure the electronics assembly for operation as an actively transmitting device.

34 Claims, 4 Drawing Sheets

ACOUSTIC WAVE DEVICE WITH DIGITAL DATA TRANSMISSION FUNCTIONALITY

FIELD OF THE INVENTION

The present invention generally concerns electronics assemblies that transmit various information related to identification variables and/or measurements of selected physical or environmental conditions. More particularly, the subject tire electronics assemblies utilize acoustic wave devices in an oscillator circuit provided with RF capabilities, yielding a transmitter device for relaying digital data as well as sensed parameter information.

BACKGROUND OF THE INVENTION

The incorporation of electronic devices with pneumatic tire structures yields many practical advantages. Tire electronics may include sensors and other components for relaying tire identification parameters and also for obtaining information regarding various physical parameters of a tire, such as temperature, pressure, tread wear, number of tire revolutions, vehicle speed, etc. Such performance information may become useful in tire monitoring and warning systems, and may even potentially be employed with feedback systems to regulate proper tire parameters.

Yet another potential capability offered by electronics systems integrated with tire structures corresponds to asset tracking and performance characterization for commercial vehicular applications. Commercial truck fleets, aviation craft and earth mover/mining vehicles are all viable industries that could utilize the benefits of tire electronic systems and related information transmission. Radio frequency identification (RFID) tags can be utilized to provide unique identification for a given tire, enabling tracking abilities for a tire. Tire sensors can determine the distance each tire in a vehicle has traveled and thus aid in maintenance planning for such commercial systems. Vehicle location and performance can be optimized for more expensive applications such as those concerning earth-mining equipment.

One particular type of sensor, or condition-responsive device, that has recently become desirable for use in certain tire electronics systems to determine various parameters related to a tire or wheel assembly is an acoustic wave device, such as a surface acoustic wave device (SAW). SAW devices have desirable properties for certain sensor applications since they are sensitive, use very little power, and can be operated at RF frequencies convenient for relaying information in a wireless fashion. SAW devices may include at least one resonator element made up of interdigital electrodes deposited on a piezoelectric substrate. When an electrical input signal is applied to a SAW device, selected electrodes cause the SAW to act as a transducer, thus converting the input signal to a mechanical wave in the substrate. Other structures in the SAW reflect the mechanical wave and generate an electrical output signal. In this way, the SAW acts like an electromechanical resonator. A change in the output signal from a SAW device, such as a change in frequency, phase and/or amplitude of the output signal, corresponds to changing characteristics in the propagation path of the SAW device. In some SAW device embodiments, monitored device frequency and any changes thereto provide sufficient information to determine parameters such as temperature, and strain to which a SAW device is subjected.

In conventional implementations of SAW devices in tire-related applications, SAW sensors transmit information only about the parameters being sensed. However, it is often desirable to relay a variety of other information related to a tire and/or wheel environment, including but not limited to vehicle speed, number of tire revolutions, amount of tire deflection, tire identification information, etc. While various implementations of acoustic wave devices such as SAW sensors in tire electronic systems have been developed, and while various combinations of information have been wirelessly relayed from a tire or wheel assembly using conventional technologies, no design has emerged that generally encompasses all of the desired characteristics as hereafter presented in accordance with the subject technology.

SUMMARY OF THE INVENTION

In view of the recognized features encountered in the prior art and addressed by the present subject matter, an improved electronics assembly for integration with a tire structure has been developed. Such an electronics assembly includes an acoustic wave device connected as a feedback element in an oscillator/amplifier and further coupled to an antenna element, thus forming an active transmitter configuration. The RF carrier frequency or frequencies generated by the transmitter are determined by the acoustic wave device sensor, and therefore, the frequency or frequencies in the transmitted RF signal represent the sensed parameters. At the same time, the transmitted signal amplitude is controlled by means of a separate circuit connected to the oscillator amplifier. In the simplest embodiment, the transmitted signal is switched on and off in a timed sequence, but other amplitude modulation methods are possible. One advantage of this method is circuit simplification and power savings. Instead of requiring the circuitry in the tire to measure the sensed parameters, covert them to digital format, and encode them in a transmitted digital data stream, the sensed parameter information is conveyed through the transmitted RF frequency. The method provides for the transmission of any other information desired, however complex or simple, by amplitude modulation of the transmitted signal. Such a circuit configuration provides for the ability to actively transmit a combination of information from integrated tire electronics to a remote receiver location. The combination of information corresponds to the physical parameters sensed by the acoustic wave device as well as digital data superimposed on the RF signal emitted by the acoustic wave device by selectively switching the amplifier on and off.

It is an advantage of some exemplary embodiments of the present invention in that versatility is afforded to the types of information that can be transmitted via the disclosed electronics assemblies. Such information can include sensed information relating to parameters such as temperature and pressure associated with a tire or wheel assembly. Other information may include selected combinations of a unique tag identification, distance traveled, number of tire revolutions, vehicle speed, amounts of tread wear, amounts of tire deflection, the amount of static and/or dynamic forces acting on a tire, etc. So many different types of information are possible in part because a microcontroller can be configured to modulate any type of desired data on the RF output signal(s) from the subject electronics assembly.

It is another advantage of some exemplary embodiments of the present invention to provide an actively operating electronic assembly capable of transmitting information without the need for an external power source. In accordance with such active operation, an acoustic wave sensor is provided with a proximal means such as a battery, piezoelectric generator, or other integrated power source for powering selected electronic components and for energizing the sensor such that it can actively transmit to a remote receiver location. This eliminates the need for transmitter electronics in a corresponding interrogator, resulting in a large reduction in the power requirements for such data acquisition electronics.

In further accordance with select embodiments of the present invention, yet another advantage corresponds to the fact that the electromagnetic source used to energize the condition-responsive device is in close proximity to such device. Thus, a mere fraction of the energy emitted with the transceiver interrogation method is required to be provided to the condition-responsive device. Alternatively, the same amount of energy as in the transceiver interrogation method could be provided to the condition-responsive device, thus yielding an output signal with a much higher power level, enabling greater read distances for a remote data receiver.

A still further advantage for select embodiments of the present invention is that a SAW sensor is provided with the ability to transmit digital data via an RF link to nearby receivers at relatively low cost, with a relatively good signal-to-noise ratio, and using minimum power and complexity. With further regard to minimized system complexity, it is significant to note that a single gain block can be utilized to effect simultaneous oscillation at more than one (e.g., three distinct) resonant frequencies.

In one exemplary embodiment of the present invention, a tire assembly with integrated electronic components includes a tire structure, a condition-responsive device, an antenna, a gain circuit, and a control element. The condition-responsive device is preferably configured to sense information about at least one physical parameter associated with the tire structure, such as but not limited to temperature and pressure. The condition-responsive device is provided as a feedback element for the gain circuit to form an oscillator circuit capable of simultaneous oscillation at multiple frequencies corresponding to respective resonant frequencies of the resonator elements in the condition-responsive device. The antenna may also be connected to the condition-responsive device for transmitting radio frequency (RF) output signals. The control element is configured to modulate digital data on the RF output signals by selectively controlling operation of the gain circuit. In some embodiments, an internal power generation device for supplying power to elements of the electronics assembly may also be present.

In accordance with yet another embodiment of the present invention, a tire assembly with integrated electronic components includes a tire structure, a condition-responsive device, an antenna, first and second amplifiers, and a control element. The condition-responsive device is preferably configured to sense information about at least one physical parameter associated with the tire structure, such as but not limited to temperature and pressure. The condition-responsive device is provided as a feedback element for one of the amplifiers to form an oscillator circuit capable of simultaneous oscillation at multiple frequencies corresponding to respective resonant frequencies of the resonator elements in the condition-responsive device. A second amplifier is configured as a separate buffer amplifier to drive the antenna. The use of a separate amplifier circuit may be advantageous in controlling the impedance of the oscillator portion of electronics assembly as well as in controlling the nature of the signal fed to the antenna. Such exemplary electronics assembly may also include a matching network for optimizing the transmission capabilities of the antenna.

Additional objects and advantages of the present subject matter are set forth in, or will be apparent to, those of ordinary skill in the art from the detailed description herein.

Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present invention may include various combinations or configurations of presently disclosed features, steps, or elements, or their equivalents (including combinations of features, parts, or steps or configurations thereof not expressly shown in the figures or stated in the detailed description of such figures). Additional embodiments of the present invention, not necessarily expressed in the summarized section, may include and incorporate various combinations of aspects of features, components, or steps referenced in the summarized objections above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present invention is particularly concerned with tire electronics assemblies that monitor and relay various information related to tire identification and/or measurements of selected physical conditions associated with a tire or wheel assembly. Exemplary electronics assembly embodiments of the present invention are respectively illustrated in FIGS. 2 and 3, with aspects of the operation of such assemblies illustrated with respect to FIGS. 4 and 5.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Figure 1A:
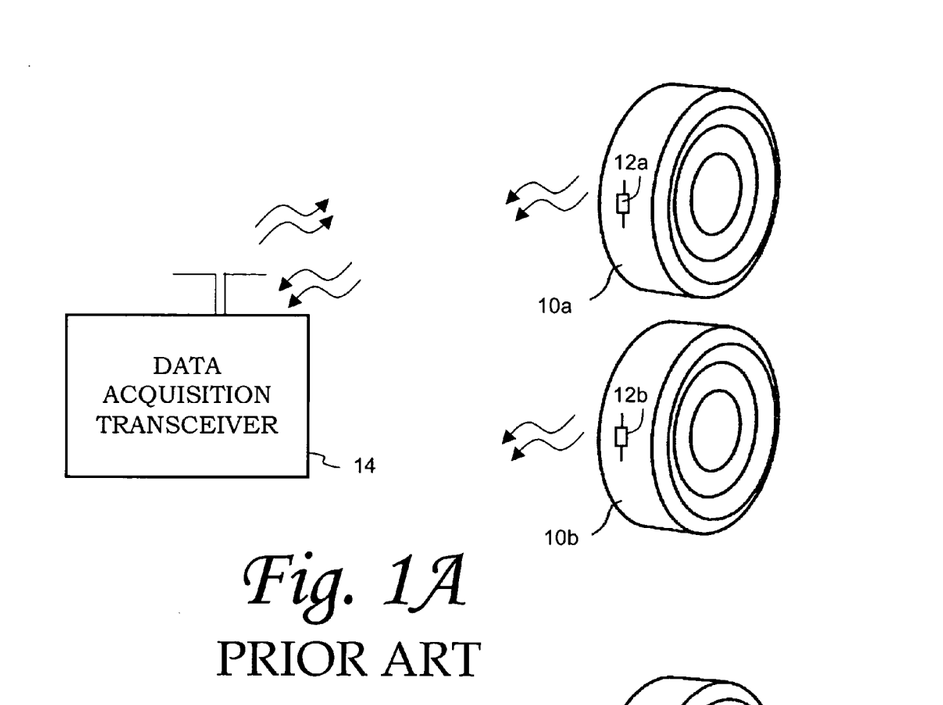
FIG. 1A is a block diagram view of a known exemplary tire monitoring system embodiment with multiple condition-responsive devices in passive communication with a remote data acquisition module.

Reference will now be made in detail to the presently preferred embodiments of the subject tire electronics assemblies. Referring now to the drawings, FIG. 1A illustrates aspects of a known tire monitoring system with passively operating electronics assemblies, each including a condition-responsive device, such as an acoustic wave sensor. Tire structures 10a and 10b may respectively incorporate condition-responsive devices 12a and 12b to monitor various physical parameters such as temperature or pressure within the tire or associated wheel assembly. Such a condition-responsive device may include at least one resonator-type sensor, such as a surface acoustic wave (SAW) resonator or a bulk acoustic wave (BAW) resonator. It should be appreciated in accordance with the present technology that a condition-responsive device can correspond to either of these specific types of sensors or to any commercially available acoustic wave sensor or other type of sensor that is resonant at a suitable frequency or frequencies. The passively operating assemblies with respective condition-responsive devices 12a and 12b of FIG. 1A are energized by a remote source. Thus, a data acquisition transceiver 14 is typically provided with both transmitter and receiver electronics to communicate with the condition-responsive devices 12a and 12b. RF pulses transmitted from the transceiver 14 to the electronics assemblies in tires 10a and 10b excite the SAW devices, which may then store some of this energy and transmit a signal back to the transceiver at the end of each energizing RF pulse.

Referring still to FIG. 1A, transceiver 14 transmits an interrogation signal that is intended to energize a given condition-responsive device 12a at its frequency of natural oscillation (resonant frequency) such that after an excitation pulse, each resonator element in condition-responsive device 12a radiates energy stored during excitation. Peak levels of this radiated energy occur at the respective resonant frequencies of the resonator elements in the condition-responsive device 12a. Such signals are then received at the transceiver 14. By monitoring changes in the frequency of the signal transmitted back from condition-responsive device 12a, information corresponding to preselected condition(s) within tire structure 10a can be determined.

Figure 2:
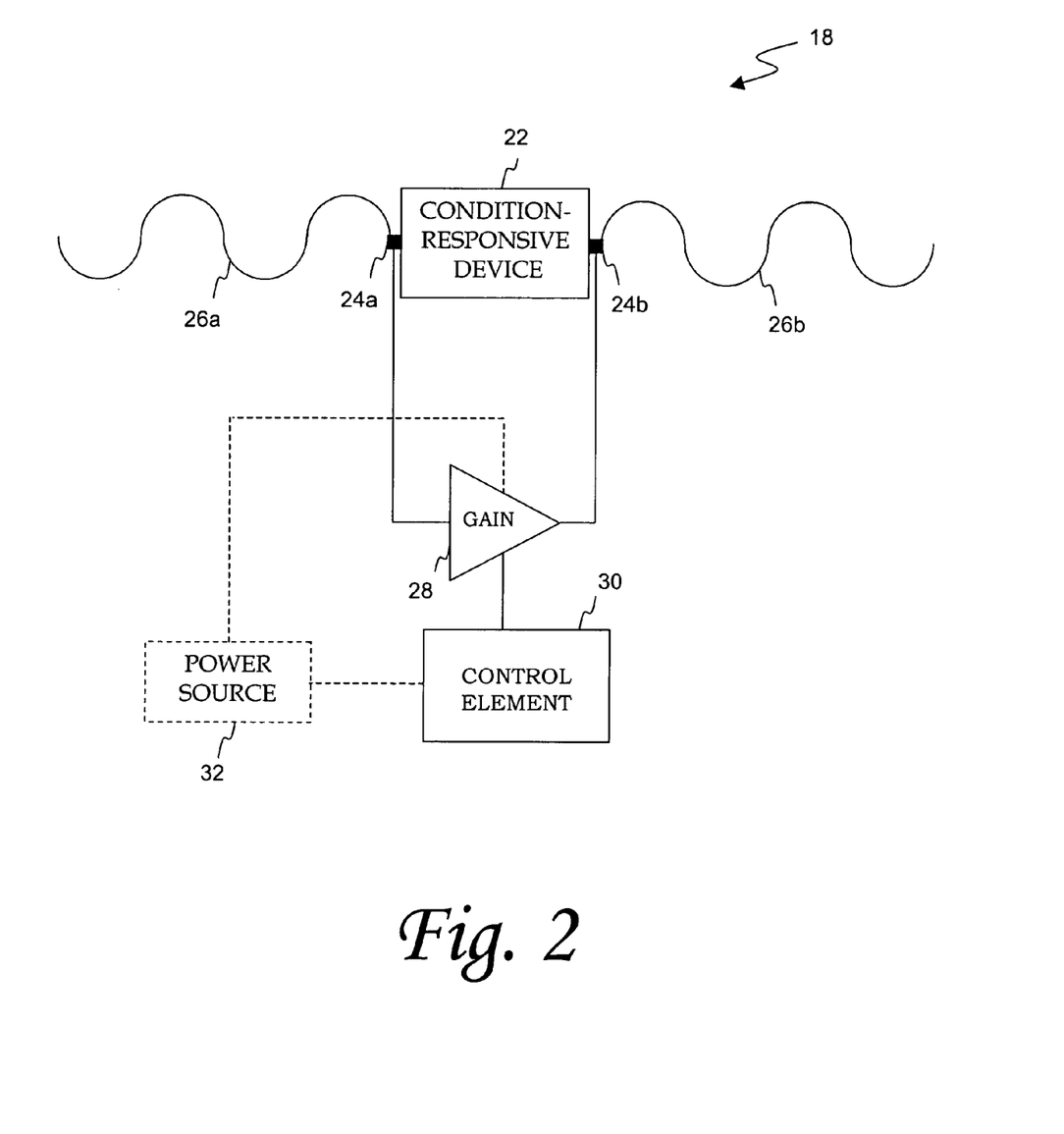
FIGS. 2 and 3 are respective schematic representations of exemplary electronics assembly embodiments with condition-responsive devices configured as digital data transmitters in accordance with the present invention.

In accordance with aspects of the present invention, electronics assemblies are provided that relay information in addition to the parameters sensed merely by condition-responsive devices themselves. Referring now to FIG. 2, a first electronics assembly embodiment 18 for monitoring predetermined conditions within a tire structure or corresponding wheel assembly is illustrated. Electronics assembly 18 may be provided in conjunction with a tire structure in a variety of fashions. For instance, electronics assembly 18 may be attached to the interior of a tire structure or some other location relative to a wheel assembly. Alternatively, electronics assembly 18 may be embedded within a tire structure itself. Still further, electronics assembly 18 may be encased in an elastomer material with appropriate dielectric properties that may then be adhered to or embedded within a tire structure. The electronics assembly may also be packaged in any number of ways and may be attached to the wheel assembly, the valve stem, or in any other place which allows for substantially accurate measurement of environmental conditions such as temperature and pressure as associated with the tire. In accordance with the variety of possible locations for electronics assembly 18, it will be appreciated in accordance with the present subject matter that an electronics assembly "integrated" with a tire structure or wheel assembly is intended to encompass all such possible locations and others as within the purview of one of ordinary skill in the art.

Electronics assembly 18 preferably includes a condition-responsive device 22, such as a sensor based on acoustic wave technology, which is capable of sensing various information about given tire conditions, such as temperature and pressure. A specific example of a condition-responsive device for use in accordance with embodiments of the present invention is a SAW device as developed by TRANSENSE TECHNOLOGIES, PLC. Specific aspects of such a SAW device are disclosed in published U.S. patent application Ser. No. 10/057,460, which is incorporated herein by reference for all purposes. Such a SAW device includes at least three resonator elements, each operating at a different resonant frequency. One specific example of three different resonant frequencies that may be simultaneously radiated for a given combination of environmental conditions is 433.28 MHz, 433.83 MHz, and 434.26 MHz. Each resonance shifts slightly in response to one or more parameters being sensed. Three resonator elements in combination yield a condition-responsive device that provides sufficient information to determine both the temperature and pressure levels in a tire. The resonant frequencies for such multiple resonator elements are preferably designed such that the distance between adjacent resonant frequencies is always greater than the resonator bandwidths at any pressure or temperature condition within a tire.

Condition-responsive device 22 may be configured as a single port device with two or more physical connection points 24a and 24b to the single port. A gain circuit 28 is connected to the condition-responsive device's input port via such electrical connections 24a and 24b, which may physically be made by a variety of methods. For instance, lead wires from gain circuit 28 may be soldered to respective pads on condition-responsive device 22, or they may be pinned into or onto the attachment points at the device, or attached using clamps, screws, conductive adhesive, or other means as within the purview of one of skill in the art.

The combination of condition-responsive device 22 and gain circuit 28 forms an oscillator circuit. The condition-responsive device 22 forms the feedback element required for operation of the oscillator. The gain circuit is configured to provide a sufficient amount of amplification such that the overall loop gain is greater than or equal to one, thus ensuring positive feedback and effective oscillator operation. The gain circuit is also designed such that the total phase shift through gain circuit 28 and condition-responsive device 22 is an integer multiple of three-hundred-and-sixty (360) degrees, thus leading to simultaneous oscillation of each resonator element in condition-responsive device 22. Gain circuit 28 may be designed to have many various circuit configurations, and may be provided by a single amplifier element (such as an operational amplifier, a field-effect transistor (FET), a bipolar junction transistor (BJT), or other type of transistor) or by an integrated circuit such as one including an amplifier element in selective combination with other active and/or passive components such as but not limited to resistors, inductors, diodes, capacitors, transistors and others as required to implement a combination of positive feedback and appropriate phase shift as required for effective oscillation. An additional exemplary configuration for the oscillator embodied by gain circuit 28 and condition-responsive device 22 is a Colpitts oscillator, as are well known to those of ordinary skill in the art.

An antenna may also be connected to the input port of condition-responsive device 22 to facilitate the transmission of output signals therefrom. By coupling the oscillator formed by condition-responsive device 22 and gain circuit 28 to an antenna, a transmitter is formed. For instance, two antenna wires 26a and 26b may be provided in combination to serve as a dipole antenna for the condition-responsive device 22. Antenna wires 26a and 26b may have respective straight or curved configurations and lengths that are optimized for desired radiation performance. It should be appreciated in accordance with the present subject matter that utilization of other antenna configurations, such as monopole antennas, loop antennas, helical antennas, or others as within the purview of one of ordinary skill in the art, is within the spirit and scope of the present invention.

Referring still to FIG. 2, a control element 30 may also be connected to gain circuit 28 to provide a means for selectively switching the oscillator on and off, thus superimposing a digital data stream on the RF signal radiated from the antenna embodied by antenna elements 26a and 26b. By selectively controlling operating power to the gain circuit 28, data is effectively modulated at the condition-responsive device 22. The control element 30 providing such ON/OFF modulation may correspond to a microcontroller with optionally varied degrees of functionality. Specific information may be stored in onboard memory associated with a microcontroller and an output signal indicative of such specific information may be coupled to the input of gain circuit 28 to modulate that specific data on the RF signals radiated by condition-responsive device 22. In other embodiments of the present invention, control element 30 may correspond to a radio frequency identification (RFID) chip. RFID chips often include their own microcontroller that can be employed to selectively control the connection between control element 30 and gain circuit 28. An RFID microcontroller may be characterized by limited functionality and thus provision of an additional control element in such instances is within the spirit and scope of embodiments of the present invention.

Figure 4:
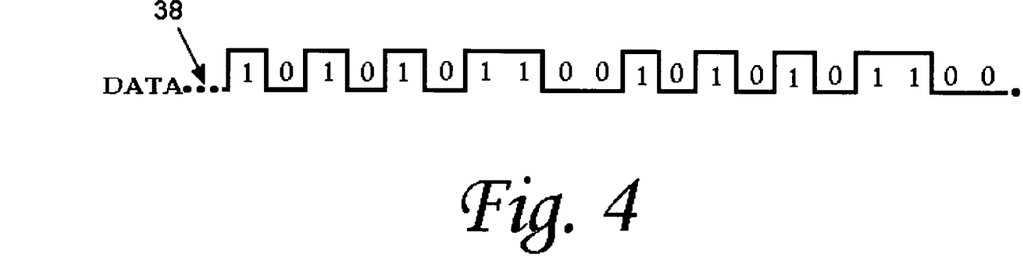
FIGS. 4 and 5 provide exemplary respective graphical representations of a modulated data signal that may be transmitted from an electronics assembly in accordance with embodiments of the present invention.
Figure 5:
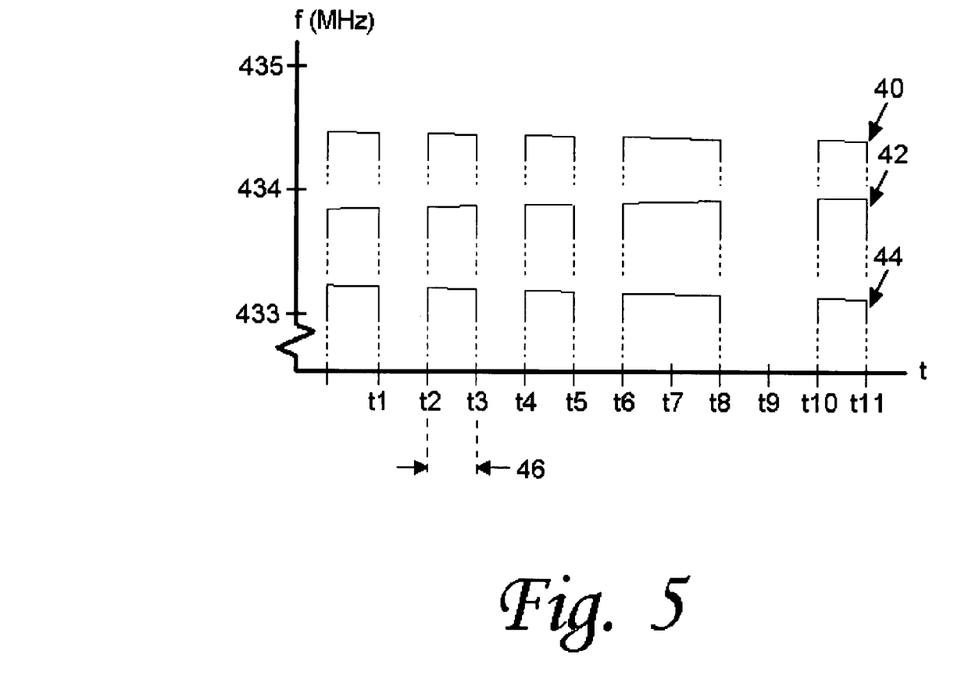

An example of how data is modulated and transmitted in accordance with the subject electronics assemblies is now presented with respect to FIGS. 4 and 5. For instance, referring to FIG. 4, providing power from the control element 30 to gain circuit 28 (thus turning the oscillator "ON") may correspond to the transmission of a binary "1" while a lack of power from control element 30 to gain circuit 28 (thus turning the oscillator "OFF") may correspond to the transmission of a binary "0," representative of simple Amplitude Shift Keying (ASK) modulation of data transmitted by the condition-responsive device 22 via antenna wires 26a and 26b. The ON/OFF modulation of digital data onto signal 38 could correspond to a variety of information, such as that representative of such parameters as the tread wear, revolution count, vehicle speed, sidewall deflection levels, etc. associated with a given tire assembly. If the control element 30 is an RFID transponder, then the data modulation could be controlled to transmit a unique identification variable corresponding to the associated tire assembly. RFID tags prove helpful in asset tracking and other tire monitoring applications. A unique identification variable as typically conveyed via RFID transponders may alternatively by stored in memory associated with a more functional microcontroller. In this fashion, other information than an RFID tag may also be modulated onto signal 38.

As previously mentioned, an advantage of the present subject matter is that a combination of information is transmitted in accordance with the disclosed electronics assemblies. A data signal radiated from exemplary electronics assembly 18 carries two independent streams of information. The first stream of information is the digital information effected by the ON/OFF modulation provided via the coupling from control element 30 to gain circuit 28. The second stream of information is determined by the resonant frequencies of the condition-responsive device 22 (which depend on the physical parameters being sensed.)

As previously mentioned, in some exemplary embodiments, condition-responsive device 22 includes a plurality of resonator elements each configured to operate at slightly different resonant frequencies. For example, consider a SAW sensor with three resonant elements that resonate on or near 433.28 MHz, 433.83 MHz, and 434.26 MHz. FIG. 5 provides an exemplary graphical representation of the output frequency versus time for such a SAW sensor when it is configured as a transmitting oscillator in accordance with exemplary embodiments of the presently disclosed technology. With three resonant elements, the transmitted signal output will consist of three separate frequencies, 40, 42 and 44, respectively. Referring to FIG. 5, the oscillator is on (thus modulating a binary "1" on the transmitted output) between times t0 and t1, t2 and t3, t4 and t5, t6 and t8, and between t10 and t11. In contrast, the oscillator is off (thus modulating a binary "0" on the transmitted output) between times t1 and t2, t3 and t4, t5 and t6, and between t8 and t10. The transmitted signal amplitude(s) can be analyzed to determine what data is modulated on the output. The exemplary data pattern modulated between time t0 and time t11 on the output represented in FIG. 5 corresponds to the digital stream "10101011001".

One aspect to note with regard to data modulation in accordance with the present subject matter is the desired bit rate for data modulation. Since SAW resonators typically have a very high Q, it is important that the bit rate be slow enough to allow a sufficient decay of the oscillation during "OFF" periods such that the receiving circuitry can discriminate between "ON" and "OFF" data bits. For example, consider a resonant element in a SAW sensor having a resonant frequency of 433.28 MHz. If the SAW device rings for 100 cycles at this resonant frequency (meaning that the SAW device will still radiate energy for 100 cycles after power to the amplifier is removed), then the time from $t_{n-1}$ to $t_n$ (for example, time elapse 46) should be sufficiently greater than 0.25 microseconds.

Referring still to FIG. 5, the other portion of information that can be determined from the exemplary output represented in FIG. 5 concerns the sensed parameters from the SAW device. Each resonator element in the SAW device will resonate at a slightly different frequency, and each of those frequencies will vary slightly depending on the state(s) of the physical condition the sensor is monitoring. By monitoring the values of these distinct resonant frequencies, information concerning temperature, pressure, or other conditions associated with a tire can be interpolated. For instance, in one exemplary SAW sensor embodiment having three respective resonator elements, one resonant frequency can be interpolated to represent a given pressure value and a temperature value can be interpreted from a differential of the other two resonant frequencies.

Referring again to FIG. 2, it is an option that electronics assembly 18 is configured as an active assembly, whereby a power source 32 may also be provided to power selected elements of the assembly 18, such as the gain circuit 28 and the control element 30. In some embodiments, power source 34 may be a battery, such as but not limited to a rechargeable battery. In other embodiments, power source 34 may be an internal power generation device such as one that includes piezoelectric elements configured to convert mechanical energy from tire rotation to electrical energy that may then be stored therein. An example of a power generation device for utilization with the present subject matter is disclosed in currently pending U.S. patent application Ser. No. 10/143,535, entitled "System and Method for Generating Electric Power from a Rotating Tire's Mechanical Energy Using Piezoelectric Fiber Composites," which is incorporated by reference herein for all purposes. In other applications where a power source 32 is not provided as an integrated component of electronics assembly 18, power may be inductively coupled from a wheel well to the electronics assembly in a tire or rectified RF power may alternatively be utilized. It should be appreciated that any type of specific power source may be employed, while still remaining within the spirit and scope of the present subject matter.

There may be advantages in certain applications by operating electronics assembly 18 as an active system as opposed to a passive system that reflects energy radiated from a remote transceiver as described with respect to FIG. 1A. Providing signals from a remote transceiver to an acoustic wave device often requires complex integrated circuitry as the interrogator must include electronics for both transmitting a signal to the acoustic wave device as well as for receiving a signal therefrom. Interrogation by a remote receiver often results in high levels of electromagnetic emissions as the transmitted signal must typically be characterized by power levels high enough to propagate through the tire or wheel assembly before reaching and energizing the acoustic wave device. Such high levels of electromagnetic emissions correspond to a relatively inefficient form of signaling for some applications and may provide a potential source of interference in other nearby wireless communication systems. By enabling the subject electronics assemblies 18 to actively transmit sensed information from respective tire structures to a data acquisition receiver, the need for transmitter electronics at the data acquisition device is eliminated. Furthermore, the need to transmit a high-powered energizing signal from an interrogator (as represented in FIG. 1A) is obviated.

Figure 1B:
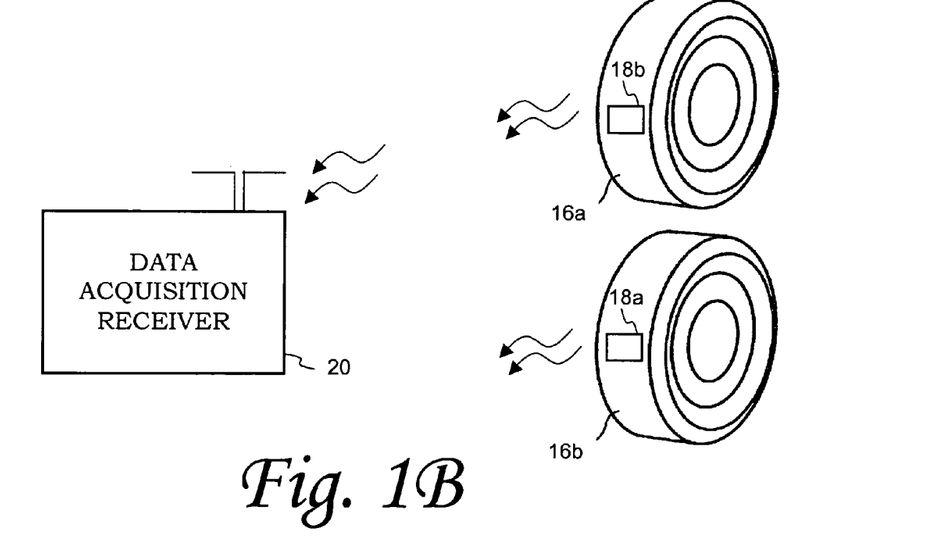
FIG. 1B is a block diagram view of an exemplary tire monitoring system embodiment with multiple condition-responsive devices in active communication with a remote data acquisition module in accordance with the present invention.

Aspects of active component operation in accordance with some exemplary embodiments of the present invention are presented with respect to FIG. 1B. Tire structures 16a and 16b may be outfitted with respective electronics assemblies 18a and 18b, which utilize internal power generation features to yield an actively transmitting electronics assembly. By enabling the electronics assemblies 18a and 18b to actively transmit sensed information and modulated data from respective tire structures 16a and 16b to a data acquisition receiver 20, the need for transmitter electronics at the data acquisition device is eliminated. Furthermore, the need to transmit a high-powered energizing signal from an interrogator (as illustrated in FIG. 1A) is obviated. By selectively controlling when each respective electronic assembly 18a, 18b transmits information to data acquisition receiver 20, the probability of colliding data transmissions from multiple devices operating in the same energizing field is greatly reduced. Other embodiments of the present invention may not necessarily generate power internally for active operation as depicted in FIG. 1A, but still employ data modulation functionality in combination with a condition-responsive device.

Figure 3:
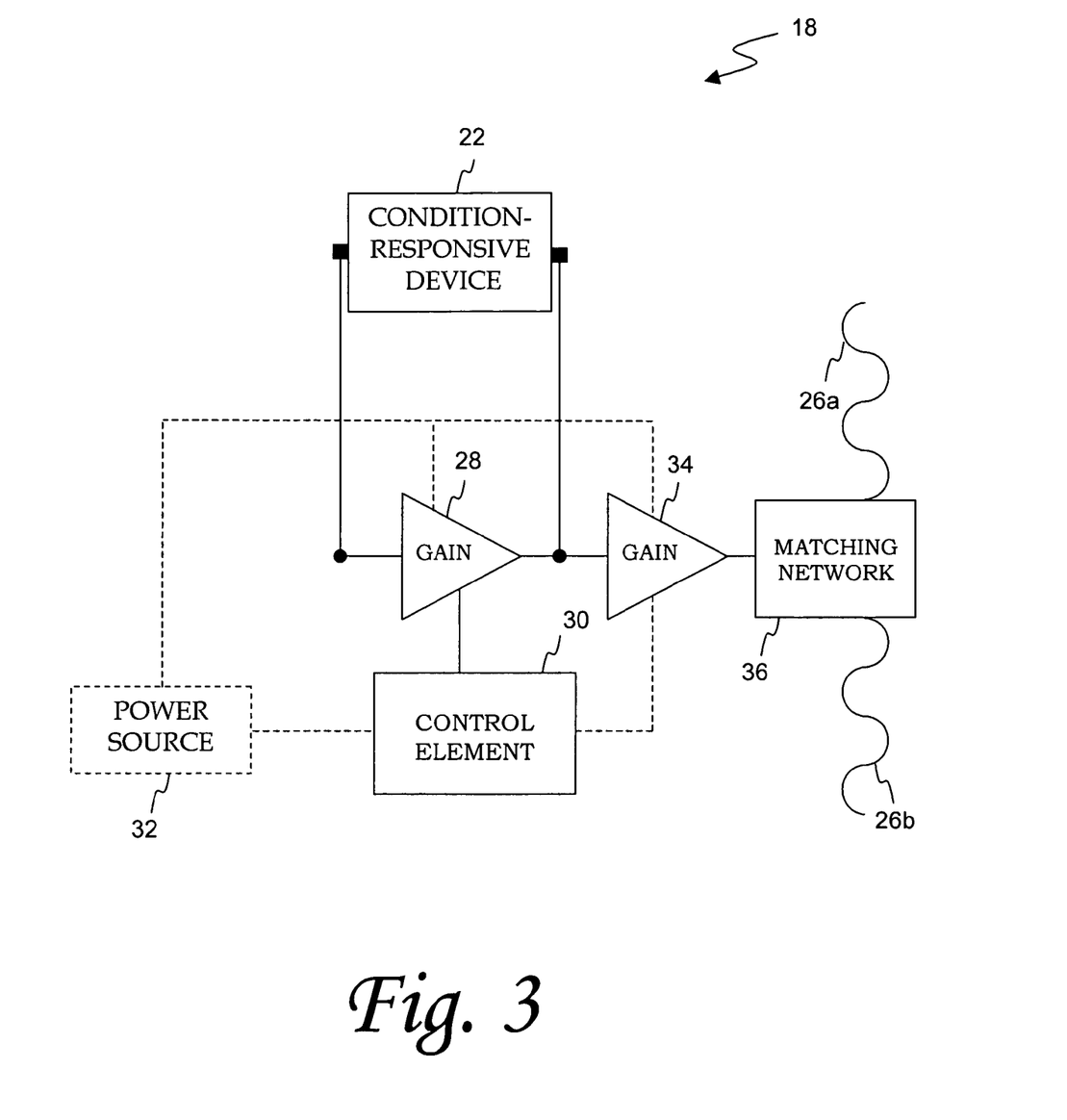

Referring now to FIG. 3, another exemplary electronics assembly embodiment 18 is illustrated. Elements of the embodiment of FIG. 3 are similar to those of FIG. 2 and thus like reference numerals are utilized to indicate such instances. Electronics assembly embodiment 18 of FIG. 3 includes a similar oscillator configuration as the embodiment of FIG. 2, with a second gain circuit 34 configured as a separate buffer amplifier to drive the antenna embodied by antenna elements 26a and 26b. The use of a separate gain circuit 34 may be advantageous in controlling the impedance of the oscillator portion of electronics assembly 18 as well as in controlling the nature of the signal fed to the antenna 26a, 26b. The circuit according to this embodiment also reduces the constraints on data transmission rate. Gain circuit 34 may be embodied by an operational amplifier, a field-effect transistor (FET), a bipolar junction transistor (BJT), or other type of transistor, or by an integrated circuit such as one including an amplifier element in selective combination with other active and/or passive components such as but not limited to resistors, inductors, diodes, capacitors, transistors and others. The electronics assembly 18 of FIG. 3 may also include a matching network for optimizing the transmission capabilities of the antenna elements 26a, 26b. Matching network 36 may include a select combination of active and/or passive components such as but not limited to resistors, inductors, diodes, capacitors, transistors and others.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An electronics assembly for relaying data associated with a tire or wheel assembly, said electronics assembly comprising:
   a gain circuit characterized by at least one input and at least one output;
   a condition-responsive device configured to sense information about its surrounding environment, wherein said condition-responsive device is connected as a feedback element between the at least one input and the at least one output of said gain circuit such that said gain circuit and said condition-responsive device form an oscillator circuit operating at one or more frequencies associated with the condition-responsive device;
   an antenna coupled to said oscillator circuit for facilitating the transmission of RF output signals therefrom; and
   a control element coupled to said oscillator circuit and configured to selectively control operation of said gain circuit, thus modulating digital data on the RF output signals transmitted from said oscillator circuit.

2. The electronics assembly of claim 1, wherein said gain circuit comprises an operational amplifier or a transistor.

3. The electronics assembly of claim 1, further comprising a power source for supplying power to said control element and said gain circuit.

4. The electronics assembly of claim 3, wherein said power source comprises a battery or a piezoelectric generator.

5. The electronics assembly of claim 1, wherein said condition-responsive device comprises an acoustic wave sensor.

6. The electronics assembly of claim 1, wherein said condition-responsive device comprises a surface acoustic wave (SAW) device with at least three resonator elements for resonating at respective resonant frequencies, and wherein the respective resonant frequencies of the at least three resonator elements collectively provide sufficient information to determine the temperature and pressure levels of said surrounding environment.

7. The electronics assembly of claim 1, wherein the one or more operating frequencies of said oscillator circuit are within a range from about 400 MHz to about 500 MHz.

8. The electronics assembly of claim 1, wherein said control element comprises a microprocessor or a radio frequency identification (RFID) transponder.

9. The electronics assembly of claim 1, wherein said digital data modulated on the RF output signals transmitted from said oscillator circuit corresponds to a unique identification tag.

10. The electronics assembly of claim 1, wherein the bit rate for data modulation effected by said control element is greater than about 0.25 microseconds.

11. The electronics assembly of claim 1, wherein said antenna comprises first and second antenna elements configured for operation as a dipole antenna.

12. A transmitter device for relaying digital data as well as sensed parameter information, said transmitter device comprising:
- a first amplifier characterized by at least one input and at least one output;
- a condition-responsive device configured to sense information about at least one physical parameter, wherein said condition-responsive device is connected as a feedback element between the at least one input and the at least one output of said first amplifier;
- a second amplifier characterized by at least one input and at least one output, wherein the at least one output of said first amplifier is coupled to the at least one input of said second amplifier;
- an antenna coupled to the at least one output of said second amplifier for facilitating the transmission of RF output signals at one or more operating frequencies; and
- a control element coupled to selected of said first and second amplifiers;
- wherein the one or more operating frequencies of said RF output signals provides information about the at least one physical parameter sensed by said condition-responsive device and wherein the amplitude of said RF output signals relays digital data selectively modulated by said control element.

13. The transmitter device of claim 12, further comprising a power source for supplying power to said control element, said first amplifier and said second amplifier.

14. The transmitter device of claim 13, wherein said power source comprises a battery or a piezoelectric generator.

15. The transmitter device of claim 12, further comprising a matching network connected between said second amplifier and said antenna.

16. The transmitter device of claim 12, wherein said condition-responsive device comprises an acoustic wave sensor.

17. The transmitter device of claim 12, wherein said condition-responsive device comprises a surface acoustic wave (SAW) device with at least three resonator elements for resonating at respective resonant frequencies, and wherein the respective resonant frequencies of the at least three resonator elements collectively provide sufficient information to determine the temperature and pressure levels of said surrounding environment.

18. The transmitter device of claim 12, wherein the one or more operating frequencies of said RF output signals are within a range from about 400 MHz to about 500 MHz.

19. The transmitter device of claim 12, wherein said control element comprises a microprocessor or a radio frequency identification (RFID) transponder.

20. The transmitter device of claim 12, wherein said digital data modulated on the RF output signals by said control element corresponds to a unique identification tag.

21. The transmitter device of claim 12, wherein the bit rate for data modulation effected by said control element is greater than about 0.25 microseconds.

22. The transmitter device of claim 12, wherein said antenna comprises first and second antenna elements configured for operation as a dipole antenna.

23. A tire assembly with integrated electronic components, comprising:
- a tire structure;
- an electronics assembly integrated with said tire structure and configured to relay data associated with said tire structure, said electronics assembly comprising:
  - a first amplifier characterized by at least one input and at least one output;
  - a condition-responsive device configured to sense information about at least one physical parameter associated with said tire structure, wherein said condition-responsive device is connected as a feedback element between the at least one input and the at least one output of said first amplifier such that said first amplifier and said condition-responsive device form an oscillator circuit;
  - an antenna coupled to said oscillator circuit for facilitating the transmission of RF output signals at one or more operating frequencies; and
  - a control element coupled to said oscillator circuit;
  - wherein the one or more operating frequencies of said RF output signals provides information about the at least one physical parameter sensed by said condition-responsive device and wherein the amplitude of said RF output signals relays digital data selectively modulated by said control element.

24. The tire assembly of claim 23, wherein said electronics assembly further comprises a second amplifier characterized by at least one input and at least one output, wherein the at least one output of said first amplifier is coupled to the at least one input of said second amplifier.

25. The tire assembly of claim 23, further comprising a power source for supplying power to said control element and said first amplifier.

26. The tire assembly of claim 25, wherein said power source comprises a battery or a piezoelectric generator.

27. The tire assembly of claim 23, further comprising a matching network coupled to said antenna for optimizing the transmission capabilities of said antenna.

28. The tire assembly of claim 23, wherein said condition-responsive device comprises an acoustic wave sensor.

29. The tire assembly of claim 23, wherein said condition-responsive device comprises a surface acoustic wave (SAW) device with at least three resonator elements for resonating at respective resonant frequencies, and wherein the respective resonant frequencies of the at least three resonator elements collectively provide sufficient information to determine the temperature and pressure levels of said surrounding environment.

30. The tire assembly of claim 23, wherein the one or more operating frequencies of said RF output signals are within a range from about 400 MHz to about 500 MHz.

31. The tire assembly of claim 23, wherein said control element comprises a microprocessor or a radio frequency identification (RFID) transponder.

32. The tire assembly of claim 23, wherein said digital data modulated on the RF output signals by said control element corresponds to one or more of a unique identification tag, tire revolution information, vehicle speed information, tire deflection information, tread wear information, distance traveled, or amount of static and dynamic forces acting on a tire.

33. The tire assembly of claim 23, wherein the bit rate for data modulation effected by said control element is greater than about 0.25 microseconds.

34. The tire assembly of claim 23, wherein said antenna comprises first and second antenna elements configured for operation as a dipole antenna.

* * * * *